(12) United States Patent
Galewski

(10) Patent No.: US 9,120,905 B2
(45) Date of Patent: Sep. 1, 2015

(54) PROCESS FOR THE PREPARATION OF EXPANDABLE POLYSTYRENE

(71) Applicant: Ineos Europe AG, Vaud (CH)

(72) Inventor: Jean-Marc Galewski, Noeux-les-Mines (FR)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/413,452

(22) PCT Filed: Jun. 25, 2013

(86) PCT No.: PCT/EP2013/063280
§ 371 (c)(1),
(2) Date: Jan. 8, 2015

(87) PCT Pub. No.: WO2014/009145
PCT Pub. Date: Jan. 16, 2014

(65) Prior Publication Data
US 2015/0175765 A1    Jun. 25, 2015

(30) Foreign Application Priority Data
Jul. 10, 2012 (EP) ..................................... 12175657

(51) Int. Cl.
*C08J 9/20* (2006.01)
*C08J 3/22* (2006.01)
*C08J 9/04* (2006.01)
*C08J 9/12* (2006.01)
*C08J 9/14* (2006.01)
*C08J 9/00* (2006.01)

(52) U.S. Cl.
CPC .. *C08J 9/141* (2013.01); *C08J 3/22* (2013.01); *C08J 9/008* (2013.01); *C08J 9/0066* (2013.01); *C08J 9/20* (2013.01); *C08J 2201/024* (2013.01); *C08J 2203/14* (2013.01); *C08J 2325/06* (2013.01)

(58) Field of Classification Search
None
See application file for complete search history.

(56) References Cited

U.S. PATENT DOCUMENTS

| 5,585,410 | A | 12/1996 | Scherzer et al. | |
| 5,591,778 | A * | 1/1997 | Scherzer et al. | 521/56 |
| 8,093,308 | B2 * | 1/2012 | Shuler et al. | 521/98 |
| 2004/0220382 | A1 * | 11/2004 | Galewski | 528/480 |
| 2010/0148110 | A1 * | 6/2010 | Casalini et al. | 252/62 |
| 2011/0284793 | A1 | 11/2011 | Ponticiello et al. | |

FOREIGN PATENT DOCUMENTS

| EP | 2 025 691 A2 | 2/2009 |
| EP | 2 025 691 A3 | 2/2009 |
| WO | WO 98/51735 A1 | 11/1998 |

* cited by examiner

*Primary Examiner* — Kara Boyle
(74) *Attorney, Agent, or Firm* — Nixon & Vanderhye P.C.

(57) ABSTRACT

A process for the preparation of expandable polystyrene (EPS) containing particles of carbon black and/or graphite is disclosed, comprising: (a) forming a masterbatch by adding carbon black and/or graphite to styrene polymer, (b) adding said masterbatch to an organic phase comprising styrene and optional comonomers, and heating the organic phase to a temperature between 30 and 90° C., (c) mixing the organic phase with an aqueous phase comprising water and suspending agents preheated to a temperature between 80 and 120° C. which is higher than the temperature of the organic phase, and (d) polymerizing in a suspension polymerization reaction the styrene and optional comonomers contained in the mixed aqueous and organic phases, with an expanding agent being added before, during or after the polymerization, wherein the styrene polymer in the masterbatch contains at least 1 000 ppm of dimers. The process gives an improved product.

15 Claims, No Drawings

PROCESS FOR THE PREPARATION OF EXPANDABLE POLYSTYRENE

This application is the U.S. national phase of International Application No. PCT/EP2013/063280 filed Jun. 25, 2013 which designated the U.S. and claims priority to European Patent Application No. 12175657.1 filed Jul. 10, 2012, the entire contents of each of which are hereby incorporated by reference.

The invention relates to a process for the preparation of expandable styrene polymers containing particles of an athermanous material such as carbon black or graphite.

Expanded polystyrene has been known for many years and has proven its usefulness in many applications. It is typically prepared by expanding particles of polystyrene impregnated with expanding agents, which may then optionally be moulded into shaped articles. An important area of application is thermal insulation in the building industry.

A well known process for the production of such expanded polystyrene involves polymerising styrene optionally together with comonomers, and any required additives in suspension, with the addition of an expanding agent before, during or after polymerisation. In one version of this process, disclosed for example in FR 2725997A, an organic phase containing styrene and any comonomers together with at least one polymerisation initiator is preheated to a temperature preferably between 45° C. and 70° C. This organic phase is then added to an aqueous phase containing water and suspending agents which has been heated to a temperature preferably between 90° C. and 115° C. Polymerisation then takes place, during which an expanding agent such as pentane is continuously added to the polymerisation mixture. During the polymerisation, additives such as peroxide initiators, suspension stabilizers, chain-transfer agents, nucleating agents and softeners are usually added.

It is well known to improve the insulating properties of expanded polystyrene by incorporating within it athermanous materials such as carbon black, graphite, metal oxides, metal powders or pigment dyes. In the suspension polymerisation process described above, the athermanous material is usually added to the polymerisation mixture after polymerisation has commenced. For instance U.S. Pat. No. 6,384,094 discloses that during the suspension polymerisation, particles of graphite are added at some point following commencement of the polymerisation procedure, preferably during the first half of the polymerisation cycle. However in the case of such athermanous materials, addition of pure carbon black and/or graphite directly to the polymerisation mixture presents some difficulties. Carbon black and graphite are very hydrophilic, and when either is added to the aqueous polymerisation suspension it takes up a large amount of water. This can significantly reduce the stability of the suspension, and also results in a high moisture content in the resulting beads, which can lead to poor cell structure in the final expanded product. Furthermore, the addition of significant mineral content to the suspension can result in a substantial increase in viscosity of the suspension, which can lead to greater variation in particle size of the final polymer produced, as well as instability of the suspension. Finally, the particle size distribution of the resulting polystyrene beads is much broader than that when no carbon black is added.

Methods for reducing the internal water content of the expanded polystyrene beads are known. For example, U.S. Pat. No. 5,585,410 discloses expanded polystyrene beads containing polyethylene wax and dimeric α-methylstyrene (AMSD). AMSD is a C18 pure component obtained by the dimerisation of α-methylstyrene, as distinct from the C16 dimers formed during styrene polymerisation, and in contrast to the latter has no mixed hydrophilic/organophilic properties.

We have now developed a process which can ameliorate some of the above problems. In a first aspect the present invention provides a process for the preparation of expandable polystyrene (EPS) containing particles of carbon black and/or graphite, comprising:
(a) forming a masterbatch by adding carbon black and/or graphite to styrene polymer,
(b) adding said masterbatch to an organic phase comprising styrene and optional comonomers, and heating the organic phase to a temperature between 30 and 90° C.,
(c) mixing the organic phase with an aqueous phase comprising water and suspending agents preheated to a temperature between 80 and 120° C. which is higher than the temperature of the organic phase, and
(d) polymerising in a suspension polymerisation reaction the styrene and optional comonomers contained in the mixed aqueous and organic phases, with an expanding agent being added before, during or after the polymerisation, wherein the styrene polymer in the masterbatch contains at least 1000 ppm of dimers.

We have found that by first forming a masterbatch of carbon black or graphite in styrene polymer having a relatively high level of dimers, the hydrophilicity of the carbon black or graphite can be reduced, which results in significant process improvements. In particular, the stability of the suspension in the polymerisation step can be improved, the final moisture content of the carbon black or graphite can be reduced, and the variation in bead size of the final polystyrene can also be reduced.

The styrene polymer containing at least 1000 ppm of dimers utilised in step (a) can be obtained by polymerising styrene in a thermal polymerisation process, which generates polystyrene having a high level of oligomers (dimers and trimers) due to the low molecular weight target combined with a high polymerisation temperature. A preferred styrene polymer may have a weight average molecular weight Mw (as determined by GPC) of between 190000 and 230000, particularly between 200000 and 220000; an example of this is Empera 153 GPPS obtainable from Ineos Styrenics. An alternative styrene polymer may be a mixture of two polymers of different molecular weights, at least one of which has a molecular weight Mw of 140000-160000, usually obtained by thermal polymerisation. An example of this is a mixture of polystyrene grades Empera 251 and Empera 156, both obtainable from Ineos Styrenics. The liquid styrene polymer may contain at least 1500 ppm of dimers.

As an alternative styrene polymer containing at least 1000 ppm of dimers, it is possible to use oligomers recovered from unreacted styrene monomer during a styrene polymerisation process, such as for example described in US 2004/220382. Polystyrene exiting a bulk polymerisation process typically contains at least 600 ppm of total oligomers (dimers and trimers), and that exiting a thermal polymerisation process may contain several thousand ppm. These oligomers are removed in a devolatilisation step which follows the polymerisation; in an efficient devolatilisation process about two thirds of the polystyrene dimers and about one third of the polystyrene trimers present in the polymer can be removed in this way. The oligomers removed in such a devolatilisation process can be collected and used as liquid styrene polymer in the process of the present invention.

In one embodiment therefore the styrene polymer contains at least 2000 ppm of oligomers, and may contain at least 4000 ppm or even up to 9000 ppm of oligomers. By "dimer" in this specification is meant a compound derived from styrene monomer containing 16 carbon atoms, and by "trimer" is meant a compound derived from styrene monomer containing 24 carbon atoms. Both dimers and trimers are known to exist in more than one form. By "oligomers" of polystyrene is meant dimers and trimers of polystyrene, since the content of higher oligomers is negligible. The quantity of dimers and/or oligomers present is determined according to the following method:

1 gram of sample is dissolved in 5 ml of dichloromethane and then precipitated by adding 40 ml of iso-octane. The iso-octane/dichloromethane layer is filtered over a Millex LCR 0.5 µm filter. To the filtrate is added a known amount of eicosane as an internal standard. This solution is injected into a gas chromatograph where separation and detection takes place under the following conditions:

Column: 25 m×0.5 mm Unimetal
Costing: HT Simdist CB, df=0.15 µm
Oven temp: Initial 100° C. for 1 minute
  Heated at 15° C./minute
  Final 380° C. for 20 minutes
Injection: 1 µl, cold on column
Detection: Flame ionisation (FID)

Quantification is accomplished using the internal standard technique based on peak area response of eicosane added to the sample solution. The concentration of styrene dimers and trimers in the sample is calculated based on the added amount of eicosane following the internal standard procedure.

The quantity of dimers in the styrene polymer utilised in step (a) of the invention is important because polystyrene dimers have both hydrophilic and organophilic (or "styrenophilic") characteristics. This is illustrated by the fact that when condensed following separation from a polystyrene stream, dimers can sometimes form a third phase in addition to the aqueous phase and the organic (styrene) phase, which is effectively a very stable emulsion of water and styrene stabilised by the dimers. This property of polystyrene dimers is believed to be the reason why they act to improve the performance of the suspension polymerisation. In particular, the dimers are believed to improve the compatibility of the very hydrophilic carbon black or graphite with the liquid styrene phase, and also to reduce the ability of the carbon black/graphite to take up water.

Preferably the carbon black which is added to the organic phase in step (b) as part of the masterbatch has a particle size, by which is meant its maximum dimension, of no more than 500 nm. Carbon black usually exists in the form of agglomerates or chains which have a particle size of several microns. Therefore in order to ensure a maximum particle size of 500 nm it must be treated to reduce the particle size. It is of course possible to utilise pre-treated carbon black which has the desired particle size when forming the masterbatch. It is also preferred that graphite is treated to reduce its particle size, such that it too preferably has a maximum dimension of no more than 1000 nm, preferably no more than 500 nm.

In order to ensure maximum coverage of the carbon black or graphite surface in the masterbatch by dimers, it is preferred that the mixture of polystyrene and carbon black and/or graphite which forms the masterbatch is subjected to a shear rate of at least 40 s$^{-1}$ prior to addition of the masterbatch to the organic phase. The high shear rate breaks up the agglomerates into smaller particles. Most preferably the masterbatch is formed by adding molten styrene polymer and carbon black and/or graphite to an extruder and then mixing them in the extruder at a shear rate of at least 40 s$^{-4}$.

We have found that by using in the organic phase carbon black or graphite having a smaller particle size, the reduction in hydrophilicity caused by the use of styrene containing a high level of dimers (described above) can be increased, thereby enhancing the benefits of the invention. This is believed to be due to more efficient coating of the particles by the styrene when the particles are smaller. Furthermore, a smaller particle size can lead to an improvement in the mechanical properties of the final moulded article made from the expanded polystyrene.

The masterbatch preferably contains 20-60 wt % of carbon black and/or graphite, more preferably 30-50 wt %. The amount of carbon black and/or graphite in the organic phase following addition of the masterbatch is preferably 1-15 wt %, more preferably 2-12 wt % and most preferably 4-7 wt %.

The masterbatch prepared in step (a) is typically formed by first mixing the carbon black/graphite with styrene polymer (usually in the form of pellets), then applying a high shear rate to the mixture by melting and compounding it an extruder with a kneading capability such as a twin screw extruder available from Coperion or a kneading extruder available from Buss. The high shear rate acts to break up the agglomerates of carbon black/graphite into smaller particles as described above. If pre-treated carbon black/graphite is used in which the particle size is already suitably small, the high shear rate is not necessary. In such a case the mixture can be formed simply by melting and compounding it in a conventional extruder.

By expandable polystyrene is meant styrene polymers containing expanding agents. The expandable polystyrene of the invention typically comprises styrene homopolymer or copolymer having a content of up to 20 wt %, based on the weight of the polymer, of ethylenically unsaturated comonomer.

Generally the most preferred polystyrene formed in the suspension polymerisation is homopolystyrene, and therefore in step (b) the only monomer required is styrene. However if a copolymer of styrene and another monomer is made, preferred comonomers include styrene comonomers such as aromatic hydrocarbons having ethylenically unsaturated side chains, in particular those having the formula $C_nH_{2n-8}$ where n is an integer from 9 to 12, preferably 9 or 10. Examples include α-substituted styrenes such as α-methyl styrene, or styrenes substituted on the aromatic ring, for example by a halogen atom such as chlorine or by an alkyl radical such as methyl, ethyl or propyl: examples of these include p-methyl styrene. Other possible comonomers include acrylonitrile, acrylates or methacrylates of $C_{1-10}$ alcohols, N-vinyl compounds such as vinyl carbazole or maleic anhydride, or small amounts of comonomers having conjugated double bonds such as conjugated dienes like butadiene or divinylbenzene. Copolymers of styrene may preferably contain 50% by weight or more of styrene.

The word "polymer" in this specification is intended to refer to both homopolymer and copolymer unless otherwise specified.

In step (b) of the process of the invention, the duration of heating of the organic phase and the temperature to which it is heated are preferably chosen so as to avoid any substantial commencement of polymerisation. Thus it is preferred that the organic phase is heated to between 40° C. and 80° C., more preferably to between 45° C. and 70° C., subject to the condition that the temperature is lower that that of the aqueous phase.

The duration of the heating of the organic phase is preferably as short as possible, for example from 15 to 60 minutes, preferably from 20 to 45 minutes. Generally, as soon as the organic phase reaches the desired temperature it is mixed with the aqueous phase, and the polymerisation reaction commences. However, if desired the organic phase can be held at its heated temperature of between 30 and 90° C. for a period of 5 to 30 minutes prior to mixing with the aqueous phase.

The aqueous phase is preferably preheated to a temperature of between 90° C. and 115° C., more preferably between 95° C. and 110° C.

Mixing of the organic and aqueous phases in step (c) can be carried out in a number of ways. However it is preferred to form the mixture by adding the organic phase to the preheated aqueous phase. The addition is preferably carried out over a period of from 0.5 to 15, preferably from 1 to 10 minutes. The temperature of the mixture thus obtained corresponds to the initial temperature of the polymerisation. Typically it is 70 to 100° C., preferably 75-95° C., more preferably from 80 to 90° C. It is preferred that the aqueous phase is preheated in the polymerisation reactor, and the organic phase added directly to the reactor.

The proportion of water required in order to form the polymerisation medium for the suspension polymerisation of step (d) is typically from 50 to 200 wt %, preferably from 70 to 170 wt % based on the weight of styrene and any comonomer.

In addition to water, the polymerisation medium generally contains conventional additives such as fillers, stabilisers, antioxidants, antistatic agents, nucleating agents, sequestering agents, lubricants, dyes, products having an anti-adhesive effect during the pre-foaming step such as zinc stearate, or release agents such as glycerol esters.

Either inorganic or organic suspending agents may be employed in the suspension. They may be selected from one or more of tricalcium phosphate, barium phosphate, aluminium phosphate, calcium phosphate, magnesium diphosphate, zinc oxide, bentonite, calcium carbonate, calcium fluoride, starch, polyvinyl alcohols, salts of polyacrylic acids, gelatin, poly-N-vinylpyrrolidone and cellulose derivatives, such as hydroxyethylcellulose or carboxymethylcellulose. The proportion of suspending agent may be from 0.05 to 5 parts by weight, preferably from 0.1 to 4 wt % based on the weight of styrene and any comonomer. Preferred suspending agents are organic suspending agents; particularly preferred are polyvinyl alcohols.

Preferably the polymerisation medium contains at least one polymerisation initiator, preferably selected from free radical generators such as peroxides, hydroperoxides or persalts or organic azo compounds. Particularly preferred initiators include benzoyl peroxide, chlorobenzoyl peroxide, t-butyl perbenzoate, 2-ethyl hexyl-t-butyl percarbonate, lauroyl peroxide or azobisisobutyronitrile. The total amount of polymerisation initiator preferably ranges from 0.01 to 1 wt %, preferably from 0.05 to 0.8 wt % based on the weight of styrene and any comonomer.

In one embodiment of the invention two or more polymerisation initiators may be used which have different half-lives at a given temperature. For example as paired initiators one may use benzoyl peroxide and 2-ethyl hexyl-t-butyl percarbonate, or alternatively benzoyl peroxide and lauroyl peroxide. Thus in this embodiment of the invention, each of the initiators can act fully in different temperature ranges as the temperature rises during the polymerisation reaction. The half-life of one initiator is preferably at least 10 times, more preferably at least 20 times, for example from 10 to 200 times and more preferably from 20 to 100 times higher than that of the other initiator at a given polymerisation temperature such as 105° C.

One or more chain transfer agents may be used at the beginning or during the polymerisation reaction. Preferred chain transfer agents are mercaptans, chosen in particular from t-dodecyl mercaptan, n-dodecyl mercaptan, n-butyl mercaptan and t-butyl mercaptan. Most preferred is t-dodecyl mercaptan or α-methylstyrene dimer. The total amount of chain transfer agent depends on the desired molecular weight of the final polymer. To obtain polystyrene having a weight average molecular weight between 60000 and 250000, the total amount of chain transfer agent used is preferably from 0.005 to 3 wt %, preferably 0.01 to 2 wt %, in particular from 0.02 to 1.5 wt % based on the weight of styrene and any comonomer. To obtain polystyrene having a weight average molecular weight between 125000 and 250000, the total amount of chain transfer agent used is preferably from 0.01 to 0.5 wt %, preferably from 0.01 to 0.15 wt % based on the weight of styrene and any comonomer.

Further additives in the polymerisation medium include nucleating agents and flame retardants. Preferred flame retardants are aliphatic, cycloaliphatic and aromatic bromine compounds such as hexabromocyclododecane, pentabromomonochlorocyclohexane and pentabromophenylallyl ether. Suitable flame retardants which are capable of acting synergistically together are organic compounds having unstable C—C or O—O bonds such as dicumyl and dicumyl peroxide. Flame retardants may be added in amounts of from 0.6 to 6 wt % based on the weight of styrene and any comonomer, but in amounts of 0.1 to 1 wt % based on the weight of styrene and any comonomer when two or more are added which are capable of acting synergistically together.

Preferably the suspension polymerisation (d) is commenced at a temperature of 70 to 100° C., preferably 75 to 95° C., more preferably from 80 to 90° C.

During the suspension polymerisation (d), the quantity of carbon black or graphite present in the polymerisation medium is preferably from 0.05 to 25 wt %, more preferably from 0.5 to 8 wt % and most preferably from 1 to 4 wt % based on the weight of the resulting styrene polymer. During polymerization bead-shaped, substantially round particles are formed having an average diameter ranging from 0.2 to 2 mm, in which the particles of graphite are uniformly distributed. The beads can be coated with conventional coating compositions, eg metal stearates, glycerol esters and finely divided silicates.

At least part of the expanding agent may be added to the polymerisation medium before the polymerisation, with the remainder being added during the polymerisation. Alternatively at least some or even all of it may be added after the polymerisation. However it is generally preferred that the expanding agent is added during the polymerisation. In particular it is preferred that at least one expanding agent is added continuously to the polymerisation medium during all or part of the period of the suspension polymerisation. The addition of the expanding agent(s) is preferably performed for a period equivalent to that during which at least 40%, preferably at least 50%, in particular at least 60% of the styrene and any comonomers is converted into polymer. For example, the duration of the continuous addition may be greater than 2 hours, preferably greater than 3 hours, and in particular equal to at least 4 hours and at most equal to the total duration of the polymerisation. Preferably the addition is stopped 0.3 hours, preferably 0.5 hours before the end of the polymerisation.

The addition of expanding agent may be temporarily interrupted one or more times for a duration ranging from a few minutes to several hours, for example from 1 to 180 minutes, preferably from 5 to 120 minutes. In particular it is preferred that the continuous addition of expanding agent occurs for only part of the duration of the polymerisation, more preferably for a period equivalent to that during which at least 40 wt % and at most 99.9 wt %, preferably at least 50 wt % and at most 99.5 wt %, in particular at least 60 wt % and at most 99 wt % of the styrene and any comonomer is converted into polymer.

The (or each) expanding agent is preferably a $C_3$ to $C_6$ hydrocarbon, in particular a $C_3$ to $C_6$ alkane or cycloalkane such as n-propane, n-butane, isobutane, n-pentane, isopentane, neo-pentane, cyclopentane, n-hexane or cyclohexane, or a halogenated hydrocarbon such as dichlorodifluoromethane or trifluorochloromethane. Most preferred as expanding agents are alkanes such as pentanes, in particular n-pentane or isopentane or a mixture thereof. The total amount of expanding agent introduced into the polymerisation medium is preferably 1 to 12 wt %, more preferably from 2 to 10 wt % and most preferably from 3 to 9 wt % based on the weight of styrene and any comonomer.

The polymerisation reaction (d) is continued until the content of total residual monomer in the polymerisation medium is less than 0.2 wt %, preferably less than 0.1 wt % based on the weight of the resulting polymer.

One of the benefits of the invention is that low moisture contents in the final polymer can be obtained due to the use of the styrene containing a high level of dimers in the masterbatch, which reduces the hydrophilicity of the carbon black or graphite. Consequently it is preferred that the water content of the resulting polymer is less than 3 wt %, more preferably less than 2.5 wt %. A relatively low water content also reduces the number of very large cells in the expanded beads, which can otherwise be caused by water accumulation.

A further benefit of the invention which can be seen in the final polymer is a relatively narrow bead size distribution. This is believed to be due to the fact that the "particle identity point", the point at which the suspended polystyrene particles attain a constant size which no longer changes during the remainder of the polymerisation, is reached early in the polymerisation, which is in turn due a combination of the relatively high viscosity of the initial organic phase due to the masterbatch used in the invention, and the high rate of polymerisation due to the high initial temperature. Accordingly it is preferred that the final polymer has a bead size distribution defined by $(D_{90}-D_{10})/D_{50}$ of 0.5 or less, preferably 0.45 or less, where at least 90 wt % of the beads have an average diameter of $D_{90}$ or smaller, at least 50 wt % have an average diameter of $D_{50}$ or smaller, and at least 10 wt % have an average diameter of $D_{10}$ or smaller. $D_{50}$ of the final polymer is preferably between 0.5 and 1.5 mm, more preferably between 0.7 and 1.3 mm.

EXAMPLES

Example 1

The masterbatch of carbon black in styrene polymer was prepared using a polystyrene mixture comprising Empera® 146 and Empera® 153 polystyrenes in a 40:60 ratio which contained about 1400 ppm of dimers. Carbon black was mixed with the polystyrene in a ratio of 40:60, and the mixture first mixed intimately in a tumbler before being melted and compounded in an extruder.

The masterbatch was heated to 55° C. and initiators t-butyl peroxy-2-ethylhexanoate (Trigonox 21 from Akzo) and t-butyl peroxy-2-ethylhexyl carbonate (Trigonox 117 from Akzo) added immediately before the masterbatch was added to the organic phase.

The organic phase was prepared in a mixing drum fitted with heating capability. 2784 g of styrene was introduced into the mixing drum followed by the following additives:
Repsol wax—7.5 g
Stearic acid—1.5 g
Ethylenebisstearamide—1.5 g
Polywax 1000—3 g
Hexabromocyclododecane—75 g
Dicumyl peroxide—18 g Heating of the mixture was commenced, and at the same time 360 g of the solid masterbatch was introduced into the mixing drum over the course of about 2 minutes, with continuous agitation.

The polymerisation was carried out in a jacketed 10 L reactor fitted with an 45° angle 4-blade turbine agitator. At the same time as the organic phase was being prepared, 4923 g of demineralised water was added to the reactor and heated to 120° C. The agitation rate was 550 rpm. Then 77 g of a 5% solution of polyvinyl alcohol (Poval 224) was poured into the reactor, followed immediately by the organic phase described above.

The polymerisation was then run at 90° C. for 260 minutes, at which point the temperature was increased further to 120° C. over a period of 60 minutes, where it was maintained until 500 minutes in total had elapsed. During this time a second charge of 50 g polyvinyl alcohol solution was added at 270 minutes, and 240 g of a pentane mix (15% isopentane+85% N-pentane) was added at constant rate between 230 and 320 minutes.

The slurry was then cooled to 50° C., and the polystyrene beads were separated in a basket centrifuge, and external moisture eliminated by atmospheric drying at ambient temperature on paper for 2-3 minutes. Then the particle size distribution of the beads was assessed and the internal moisture content evaluated. The mean particle size was 1.21 mm and $D_{90}-D_{10}/D_{50}$ was 0.42. The internal moisture content was 2.3 wt %.

Example 2 (Comparative)

Several further batch polymerisations were carried out, in which the masterbatch used in Example 1 was replaced by the same quantity of a commercial masterbatch made with polystyrene (Mw=290000) containing 220 ppm of dimers.

Where possible the batch polymerisations were run until the end. However in one case a loss of suspension occurred several hours into the polymerisation. Even in the best cases a high degree of agglomeration made the measurement of particle size difficult, and the internal moisture content was between 6 wt % and 20 wt %.

The invention claimed is:
1. Process for the preparation of expandable polystyrene (EPS) containing particles of carbon black and/or graphite, comprising:
(a) forming a masterbatch by adding carbon black and/or graphite to styrene polymer,
(b) adding said masterbatch to an organic phase comprising styrene and optional comonomers, and heating the organic phase to a temperature between 30 and 90° C.,
(c) mixing the organic phase with an aqueous phase comprising water and suspending agents preheated to a temperature between 80 and 120° C. which is higher than the temperature of the organic phase, and
(d) polymerising in a suspension polymerisation reaction the styrene and optional comonomers contained in the mixed aqueous and organic phases, with an expanding agent being added before, during or after the polymerisation,
wherein the masterbatch contains at least 1000 ppm of dimers.

2. Process according to claim 1, wherein the masterbatch contains at least 1500 ppm of dimers.

3. Process according to claim 1, wherein the masterbatch contains at least 4000 ppm of oligomers.

4. Process according to claim 1, wherein any carbon black present has a maximum dimension of no more than 500 nm.

5. Process according to claim 1, wherein the mixture of polystyrene and carbon black and/or graphite which forms the masterbatch is subjected to a shear rate of at least 40 s$^{-1}$ prior to addition of the masterbatch to the organic phase.

6. Process according to claim 1, wherein the masterbatch contains 20-60 wt % of carbon black and/or graphite.

7. Process according to claim 1, wherein the organic phase following addition of the masterbatch contains 1-15 wt % of carbon black and/or graphite.

8. Process according to claim 1, wherein the organic phase following addition of the masterbatch contains 2-12 wt % of carbon black and/or graphite.

9. Process according to claim 1, wherein the organic phase is heated to between 40° C. and 80° C., subject to the condition that the temperature is lower than that of the aqueous phase.

10. Process according to claim 1, wherein the organic phase is heated to between 45° C. and 70° C., subject to the condition that the temperature is lower than that of the aqueous phase.

11. Process according to claim 1, wherein the aqueous phase is preheated to a temperature of between 90° C. and 115° C.

12. Process according to claim 1, wherein the aqueous phase is preheated to a temperature of between 95° C. and 110° C.

13. Process according to claim 1, wherein the initial polymerisation temperature is 70 to 100° C.

14. Process according to claim 1, wherein the initial polymerisation temperature is 75 to 95° C.

15. Process according to claim 1, wherein the initial polymerisation temperature is 80 to 90° C.

* * * * *